US012043053B2

(12) United States Patent
Matsushima et al.

(10) Patent No.: US 12,043,053 B2
(45) Date of Patent: Jul. 23, 2024

(54) COATING DEVICE, LIQUID DISCHARGE APPARATUS, AND PRINTER

(71) Applicants: Jun Matsushima, Kanagawa (JP); Yuji Karikusa, Kanagawa (JP); Keisuke Yuasa, Kanagawa (JP); Teiichiro Ishikawa, Tokyo (JP); Toshiya Satoh, Kanagawa (JP); Tetsuya Ohba, Kanagawa (JP)

(72) Inventors: Jun Matsushima, Kanagawa (JP); Yuji Karikusa, Kanagawa (JP); Keisuke Yuasa, Kanagawa (JP); Teiichiro Ishikawa, Tokyo (JP); Toshiya Satoh, Kanagawa (JP); Tetsuya Ohba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/578,333

(22) Filed: Jan. 18, 2022

(65) Prior Publication Data

US 2022/0274434 A1 Sep. 1, 2022

(30) Foreign Application Priority Data

Feb. 26, 2021 (JP) ................................ 2021-031262

(51) Int. Cl.

| | |
|---|---|
| ***B41M 7/00*** | (2006.01) |
| ***B41J 11/00*** | (2006.01) |
| ***B41M 5/00*** | (2006.01) |
| *B41J 2/01* | (2006.01) |

(52) U.S. Cl.
CPC ........ *B41M 7/0027* (2013.01); *B41J 11/0015* (2013.01); *B41M 5/0017* (2013.01); *B41J 2/01* (2013.01)

(58) Field of Classification Search
CPC ................ B41M 7/0027; B41M 5/0017; B41J 11/0015; B41J 2/01
See application file for complete search history.

(56) References Cited

U.S. PATENT DOCUMENTS

| | | | | |
|---|---|---|---|---|
| 2002/0006505 A1* | 1/2002 | Nishizawa | B32B 27/08 428/220 |
| 2012/0229580 A1 | 9/2012 | Ohba | |
| 2013/0106946 A1* | 5/2013 | Sunaoshi | B41J 11/0015 347/21 |
| 2021/0187970 A1 | 6/2021 | Kawarada | |

FOREIGN PATENT DOCUMENTS

| | | | |
|---|---|---|---|
| CN | 101428262 A | 5/2009 | |
| CN | 204455277 U * | 7/2015 | C23C 14/35 |
| CN | 105479938 A | 4/2016 | |

(Continued)

OTHER PUBLICATIONS

Chinese Office action; Application 202210177170.1; Dec. 26, 2023.

*Primary Examiner* — Yaovi M Ameh
(74) *Attorney, Agent, or Firm* — Duft & Bornsen, PC

(57) ABSTRACT

A coating device includes a coating roller configured to rotate in a rotation direction to apply a treatment liquid onto a sheet at an application position, and a contacting member in contact with a peripheral surface of the coating roller at a position downstream of the application position in the rotation direction.

14 Claims, 5 Drawing Sheets

(56) References Cited

FOREIGN PATENT DOCUMENTS

| | | | | | |
|---|---|---|---|---|---|
| JP | H10286511 A | | 10/1998 | | |
| JP | 2010083132 A | * | 4/2010 | ................ | B41J 2/01 |
| JP | 2010083132 A | | 4/2010 | | |
| JP | 1010122393 A | | 6/2010 | | |
| JP | 2010122393 A | | 6/2010 | | |
| JP | 2010-149449 | | 7/2010 | | |
| JP | 2012155022 A | * | 8/2012 | ............. | G03G 15/20 |
| JP | 2012-196955 | | 10/2012 | | |
| JP | 2017147369 A | * | 8/2017 | ........... | H01L 21/304 |
| JP | 2021-094799 | | 6/2021 | | |

* cited by examiner

COATING DEVICE, LIQUID DISCHARGE APPARATUS, AND PRINTER

CROSS-REFERENCE TO RELATED APPLICATIONS

This patent application is based on and claims priority pursuant to 35 U.S.C. § 119(a) to Japanese Patent Application No. 2021-031262, filed on Feb. 26, 2021, in the Japan Patent Office, the entire disclosure of which is hereby incorporated by reference herein.

BACKGROUND

Technical Field

Aspects of the present disclosure relate to a coating device, a liquid discharge apparatus, and a printer.

Related Art

A printer prints an image on a sheet as an object to be printed after applying a treatment liquid onto the sheet.

A coating apparatus dips up the treatment liquid by a squeeze roller and supply the treatment liquid to a coating roller, presses a recording medium against the coating roller by a transfer roller, and apply the treatment liquid onto the recording medium by the coating roller, for example.

SUMMARY

In an aspect of this disclosure, a coating device includes a coating roller configured to rotate in a rotation direction to apply a treatment liquid onto a sheet at an application position, and a contacting member in contact with a peripheral surface of the coating roller at a position downstream of the application position in the rotation direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
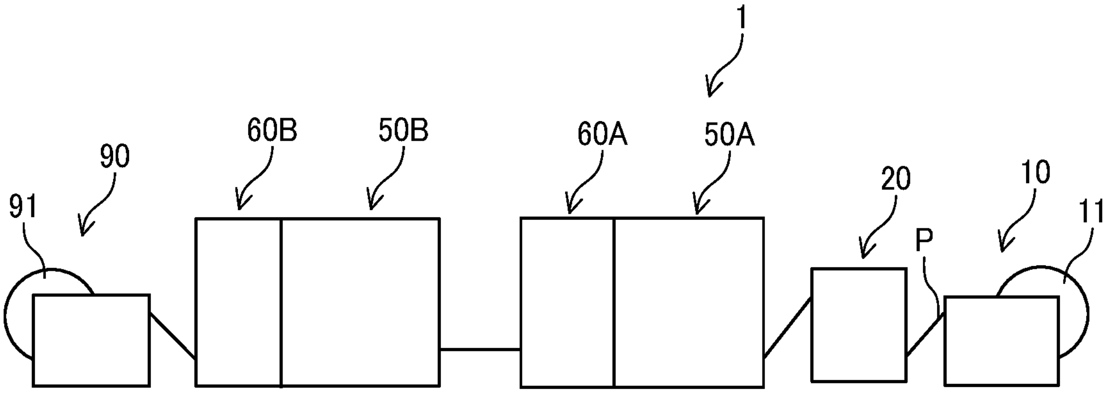
FIG. 1 is a schematic side view of a printer according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

Referring now to the drawings, wherein like reference numerals designate identical or corresponding parts throughout the several views, embodiments of the present disclosure are described below.

A printer 1 as a liquid discharge apparatus according to a first embodiment of the present disclosure is described with reference to FIG. 1.

FIG. 1 is a schematic side view of the printer 1.

This printer 1 is a liquid discharge apparatus to discharge a liquid onto a sheet P to print an image on the sheet P in the present embodiment. The printer 1 includes an unwinder 10, a coater 20, a first discharger 50A, a first dryer 60A, a second discharger 50B, and a second dryer 60B, and a winder 90.

The unwinder 10 is a carry-in unit to unwind and feed the sheet P from a winding roller 11. The sheet P is a web such as continuous paper. The coater 20 is a pretreatment unit that coats both surfaces of the sheet P fed from the unwinder 10 with a treatment liquid as a coating liquid.

The first discharger 50A is a printing unit that includes a first discharger that discharges a liquid containing a color material on one surface of the sheet P to perform a printing process. The treatment liquid has been applied to both surfaces of the sheet P by the coater 20 at the time of the printing process. The first dryer 60A is a dryer to heat and dry the sheet P onto which a liquid has been applied by the first discharger 50A.

The second discharger 50B is a printing unit that includes a second discharger that discharges a liquid containing a color material on another surface of the sheet P heated by the first dryer 60A. The second dryer 60B is a dryer to heat and dry the sheet P onto which a liquid has been applied by the second discharger 50B.

The winder 90 is a carrying-out unit that winds the sheet P, which has passed the second dryer 60B and dried by the second dryer 60B, around a winding roller 91.

Next, an example of the first discharger 50A and the second discharger 50B are described with reference to FIG. 2.

Figure 2:
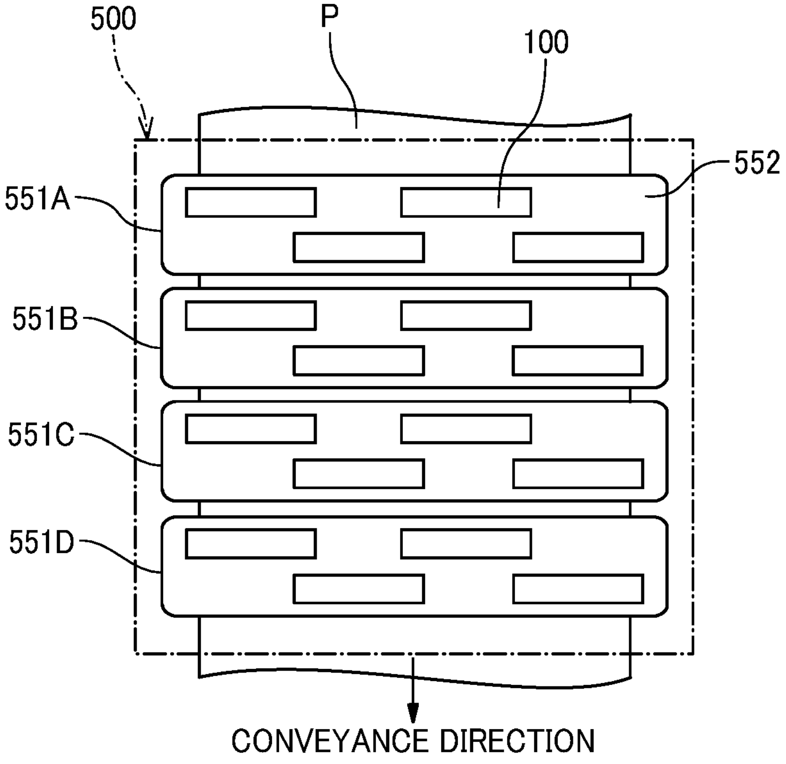
FIG. 2 is a schematic plan view of a discharger of a first discharger and a second discharger.

FIG. 2 is a schematic plan view of a discharger 500 of the first discharger 50A and the second discharger 50B.

Each of the first discharger 50A and the second discharger 50B includes the discharger 500. The discharger 500 of the first discharger 50A is referred to as a first discharger, and the discharger 500 of the second discharger 50B is referred to as a second discharger.

The discharger 500 includes four-color full-line head arrays 551A, 551B, 551C, and 551D from an upstream side in a direction of conveyance of the sheet P indicated by arrow "conveyance direction" in FIG. 2. The head arrays 551A, 551B, 551C, and 551D are collectively referred to as "head arrays 551" unless colors are distinguished.

The head arrays 551 are liquid dischargers to discharge liquid of, for example, black (K), cyan (C), magenta (M), and yellow (Y) onto the sheet P conveyed. Note that number and types of color are not limited to the above-described four colors of K, C, M, and Y and may be any other suitable number and types.

In each head array 551, for example, as illustrated in FIG. 2, liquid discharge heads 100 are staggered on a base 552 to form the head array 551. Note that the configuration of the head array 551 is not limited to such a configuration. Hereinafter, the "liquid discharge head" is simply referred to as the "head".

Next, an example of the coater 20 is described with reference to FIG. 3.

Figure 3:
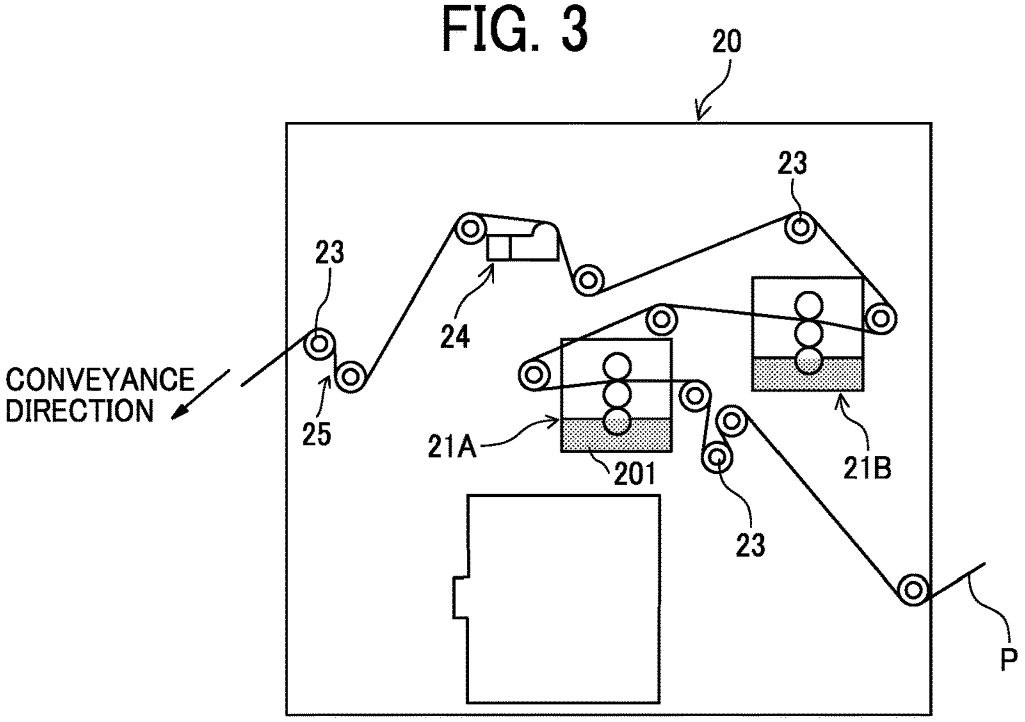
FIG. 3 is a schematic side view of an example of a coater.

FIG. 3 is an enlarged partial schematic side view of the coater 20.

The coater 20 includes a first coater 21A, a second coater 21B, multiple guide rollers 23, a cutter 24, and the like. Further, the coater 20 includes an S-shaped winding conveyance path 25 immediately before an outlet of the coater 20 to improve traveling stability of the sheet P.

The first coater 21A is a treatment liquid applier to apply a treatment liquid 201 as a coating liquid to one surface (front surface) of the sheet P conveyed. The second coater 21B is a treatment liquid applier to apply and coat a treatment liquid 201 to another surface (back surface) of the sheet P conveyed.

As the treatment liquid 201, a treatment liquid in which there is no large variation in an aggregation reaction with the ink in either a wet state or a dry state is used. For example, a precoating solution as disclosed in Japanese Patent Application Laid Open Publication No. 2019-019315 (U.S. patent application Ser. No. 16/630,578) may be used.

Next, an example of the dryer 600 forming the first dryer 60A and the second dryer 60B is described with reference to FIG. 4.

Figure 4:
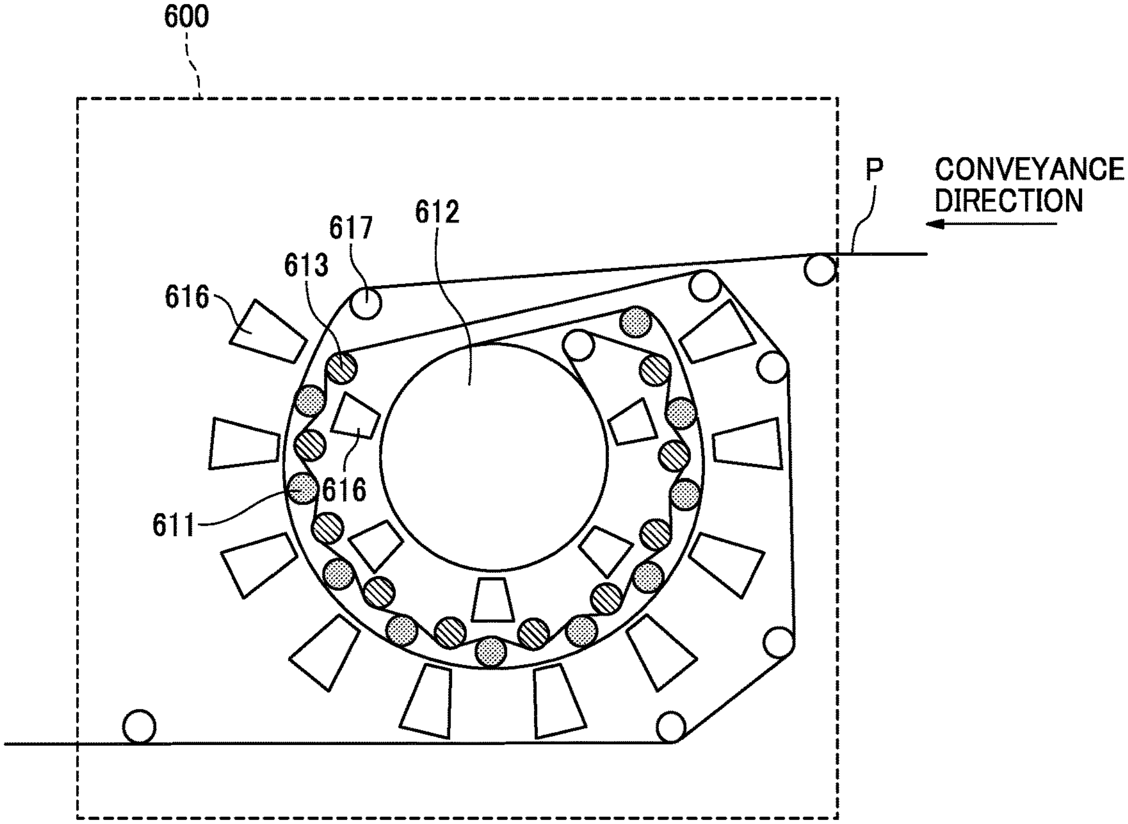
FIG. 4 is a schematic side view of an example of a dryer of a first dryer and a second dryer.

FIG. 4 is a schematic side view of an example of the dryer 600.

In FIG. 4, parts with the same function are illustrated with the same pattern, and the reference numerals of which are omitted.

Each of the first dryer 60A and the second dryer 60B includes the dryer 600. The dryer 600 of the first dryer 60A is referred to as a first dryer, and the dryer 600 of the second dryer 60B is referred to as a second dryer.

The dryer 600 includes multiple heating rollers 611 and a heating drum 612 that are in contact with the sheet P to heat the sheet P. Further, the dryer 600 includes guide rollers 613 to cause the sheet P to contact with desired heating rollers 611 among the multiple heating rollers 611 to guide the sheet P.

The multiple heating rollers 611, the heating drum 612, and the multiple guide rollers 613 form a heating conveyance path (conveyance path) to heat the sheet P. The sheet P is conveyed while contacting an outer circumference side of the multiple heating rollers 611 arranged in a circular arc shape at an upstream of the heating drum 612. Then, the guide rollers 613 conveys the sheet P passed through the heating drum 612 while the sheet P contacts again an inner peripheral side (a side of the heating drum 612) of the multiple heating rollers 611.

That is, the dryer 600 in the first embodiment cause the heating roller 611 to contact with the sheet P from different directions to heat the sheet P.

The dryer 600 includes multiple non-contact heaters 616 to heat the sheet P from a liquid application surface side on the outer circumference side of an arrangement of the multiple heating rollers 611. The dryer 600 also includes the multiple non-contact heaters 616 around the heating drum 612. The non-contact heaters 616 may include an air blower, an infrared heater (IR heater), or the like, for example. The "liquid application surface" means a surface onto which the liquid discharged by the discharger 500 of the first discharger 50A or the second discharger 50B is applied in the present embodiment.

Further, dryer 600 includes multiple guide rollers 617 to guide a conveyance of the sheet P into the dryer 600 and guide a conveyance of the sheet P outside the dryer 600.

The dryer 600 configured as described above causes a surface of the sheet P opposite to the liquid application surface of the sheet P to contact with the multiple heating rollers 611 to heat the sheet P and blows hot air toward the liquid application surface of the sheet P by the non-contact heaters 616 to heat the liquid application surface of the sheet P to perform a drying process.

Then, the heating drum 612 arranged inside the multiple heating rollers 611 contacts and heats the surface opposite the liquid application surface of the sheet P while blowing the hot air onto the liquid application surface of the sheet P by the non-contact heaters 616 to heat the liquid application surface of the P.

Then, the guide rollers 613 contact the liquid application surface of the sheet P while the heating rollers 611 contact and heat the surface opposite the liquid application surface of the sheet P again to dry the liquid applied on the sheet P.

At this time, the treatment liquid 201 applied to both surfaces of the sheet P by the coater 20 is also dried, and the treatment liquid 201 becomes a dry state.

As described above, the printer 1 includes the coater 20 including the first coater 21A and the second coater 21B to apply the coating liquid (treatment liquid 201) to both surfaces of the sheet P.

The printer 1 includes the first discharger 50A and the first dryer 60A. The first discharger 50A receives the sheet P having both surfaces coated with the treatment liquid 201 by the coater 20 as it is and discharge a liquid onto one surface of the sheet P. The first dryer 60A dries the sheet P onto which a liquid has been applied by the first discharger 50A.

Further, the printer 1 includes the second discharger 50B and the second dryer 60B. The second discharger 50B discharges a liquid onto another surface of the sheet P passed through the first dryer 60A. The second dryer 60B dries the sheet P onto which a liquid is discharged and applied by the second discharger 50B.

In the above manner, the coating liquid (treatment liquid 201) is coated (applied) to both surfaces of the sheet P, and the sheet P is fed to the first discharger 50A as the first discharger without being heated so that the first discharger 50A discharges a liquid to the sheet P with a printing liquid and the first dryer 60A dries the sheet P. As a result, the coating liquid (treatment liquid 201) applied to the sheet P and the printing liquid applied by the first discharger are dried.

Then, the second discharger 50B as the second discharger discharges a liquid onto another surface of the sheet P, and the second dryer 60B dries the sheet P.

That is, there is no means to heat the sheet P between the coater 20 and the first discharger 50A serving as the first discharger. The printer 1 includes the first dryer 60A serving as the first dryer between the first discharger 50A and the second discharger 50B.

In other words, the first discharger 50A as the first discharger discharges a liquid onto the sheet P, onto which the coating liquid (treatment liquid) is coated by the coater 20, and the sheet P is not heated. The second discharger 50B as the second discharger discharges a liquid onto the sheet P, onto which the coating liquid (treatment liquid) is coated, and the sheet P is heated by the first dryer 60A.

Further, the first discharger 50A as the first discharger discharges a liquid onto the sheet P in a wet state. The second discharger 50B as the second discharger is configured to discharge a liquid onto the sheet P in which the coating liquid is in a dried state.

Thus, the printer 1 prevents the sheet P, in which the coating liquid applied to the sheet P and the printing liquid discharged by the first discharger are in an undried state, from being fed to the second discharger 50B to be further applied with the liquid. Thus, the printer 1 can improve the print quality.

The coating device according to the first embodiment of the present disclosure is described with reference to FIGS. 5 and 6.

Figure 5:
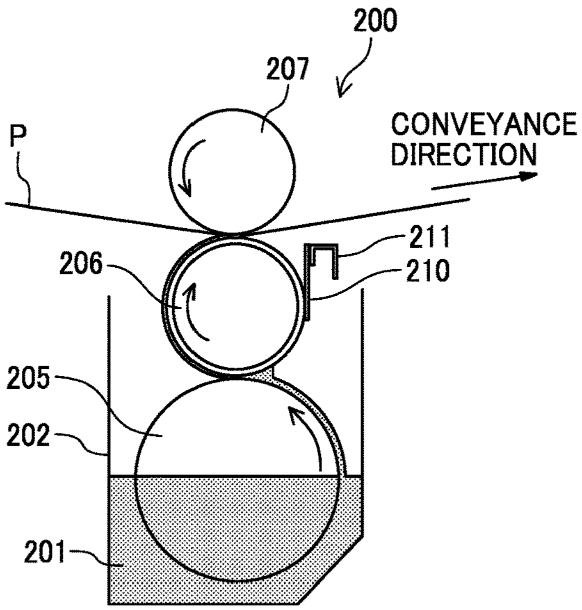
FIG. 5 is a schematic cross-sectional side view of a coating device according to the first embodiment of the present disclosure.

FIG. 5 is a schematic side view of the coating device according to the first embodiment of the present disclosure.

Figure 6:
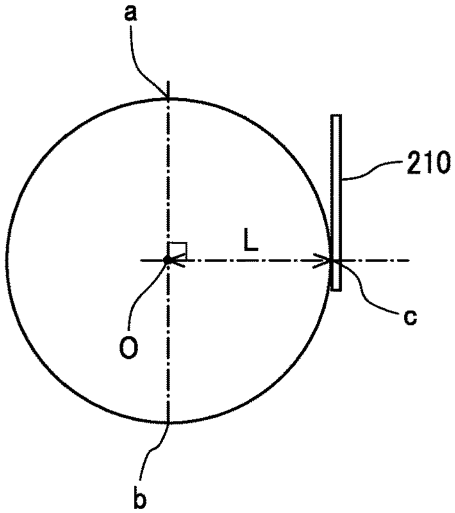
FIG. 6 is an enlarged partial side view an example of a contacting member (defoaming blade) having a different arrangement with FIG. 5.

FIG. 6 is an enlarged partial side view an example of a contacting member (defoaming blade 210) having a different arrangement with FIG. 5.

The coating device may include the first coater 21A and the second coater 21B of the coater 20 in the printer 1.

The coating device includes a treatment liquid container 202 (supply pan) serving as a coating liquid container to contain the treatment liquid 201. The treatment liquid container 202 may be formed together with a housing of the coating device.

The coating device includes a dipping roller 205 and a coating roller 206. The dipping roller 205 is housed in the treatment liquid container 202 and dips (pump) up the treatment liquid 201. The coating roller 206 applies the treatment liquid 201 onto the sheet P. The dipping roller 205 is rotated at a speed slightly lower than a conveyance speed of the sheet P.

The coating roller 206 is a coating rotor to coat (apply) the coating liquid (treatment liquid 201) onto the sheet P. The dipping roller 205 is a supply rotor to supply the treatment liquid 201 to the coating roller 206. If an intermediate roller is disposed between the dipping roller 205 and the coating roller 206, the intermediate roller contacting the coating roller 206 serves as the supply rotor.

Further, the coating device includes a pressure roller 207 to press the sheet P against the coating roller 206. The pressure roller 207 faces the coating roller 206. A pressing pressure of the pressure roller 207 may be adjusted by a pressure adjusting device or the like.

The dipping roller 205 is disposed below the coating roller 206, and the pressure roller 207 is disposed above the coating roller 206, and the sheet P passes through a nip between the pressure roller 207 and the coating roller 206.

In this coating device, the treatment liquid 201 is transferred to a surface of the coating roller 206 in a thin-film form by the dipping roller 205.

Then, the coating roller 206 is pressed against the rotated pressure roller 207 to rotate the coating roller 206. At this time, the coating device conveys the sheet P to the nip between the coating roller 206 and the pressure roller 207 to coat (apply) the treatment liquid 201 onto the surface of the sheet P.

The pressure adjusting device can adjust a nip pressure at a time of applying the treatment liquid 201 to the sheet P. The nip pressure acts on a position at which the coating roller 206 contacts the pressure roller 207. The coating device uses the pressure adjusting device to change the nip pressure between the coating roller 206 and the pressure roller 207 to adjust an application amount of the treatment liquid 201 onto the sheet P. The application amount includes a coating amount, a film thickness, a liquid amount, an adhesion amount, a dry adhesion amount, and the like.

The coating device may change a rotation speed of the coating roller 206 and the pressure roller 207 to control the application amount of the treatment liquid 201.

The coating device includes a defoaming blade 210 serving as a contacting member that is in contact with a peripheral surface of the coating roller 206. The defoaming blade 210 comes into contact with the peripheral surface of the coating roller 206 on a downstream of an application position "a" (see FIG. 6) at which the coating roller 206 applies the treatment liquid 201 onto the sheet P in a rotation direction (clockwise direction in FIG. 5) of the coating roller 206.

The defoaming blade 210 abuts against (contacts) the peripheral surface of the coating roller 206 at an upstream of a supply position "b" (see FIG. 6) at which the coating roller 206 receives a supply of the treatment liquid 201 from the dipping roller 205 in the rotation direction of the coating roller 206.

Here, the defoaming blade 210 is disposed so that the distance between the defoaming blade 210 and the peripheral surface of the coating roller 206 gradually decreases. In the present embodiment, the defoaming blade 210 is disposed along a tangential direction of the coating roller 206. The defoaming blade 210 is disposed in a forward direction with respect to the rotation direction of the coating roller 206 and abuts against the coating roller 206.

Thus, the leading end portion of the defoaming blade 210 (contacting member) is in contact with the peripheral surface of the coating roller 206, and a rear end portion of the defoaming blade 210 (contacting member) is separated from the coating roller 206. The distance L between the defoaming blade 210 (contacting member) and the peripheral surface of the coating roller 206 gradually decreases from the rear end portion toward the leading end portion of the defoaming blade 210 (contacting member).

In the present embodiment, the defoaming blade 210 is disposed along the vertical direction. Thus, the contacting member (defoaming blade 210) is a blade, a longitudinal direction of cross-section of which is along the vertical direction.

Further, the defoaming blade 210 is in contact with the peripheral surface of the coating roller 206 at a position "c" from the tangential direction in the rotation direction of the coating roller 206. The position "c" is a position at which a distance "L" of a horizontal line orthogonal to a vertical line connecting an axial center "O" of the coating roller 206 and the application position "a" becomes the longest in the rotation direction of the coating roller 206. The horizontal line has a length from the vertical line to the peripheral surface of the coating roller 206 in the horizontal direction.

A plastic film including a polyester film such as Mylar® is used as the defoaming blade 210. The defoaming blade 210 has a rear end portion fixed to an attachment member 211. A position of the defoaming blade 210 is adjusted so that a leading end portion of the defoaming blade 210 abuts on the peripheral surface of the coating roller 206 in the tangential direction. The defoaming blade 210 has a thickness of 0.188 mm, for example. If the thickness of the defoaming blade 210 is too thick, the contact pressure increases to worsen abrasion of the surface of the coating roller 206. If the thickness is too thin, the contact pressure decreases to weaken a function of crushing bubbles.

Here, a Comparative Example 1 is described with reference to FIG. 7 to illustrate a generation of bubble (foam).

Figure 7:
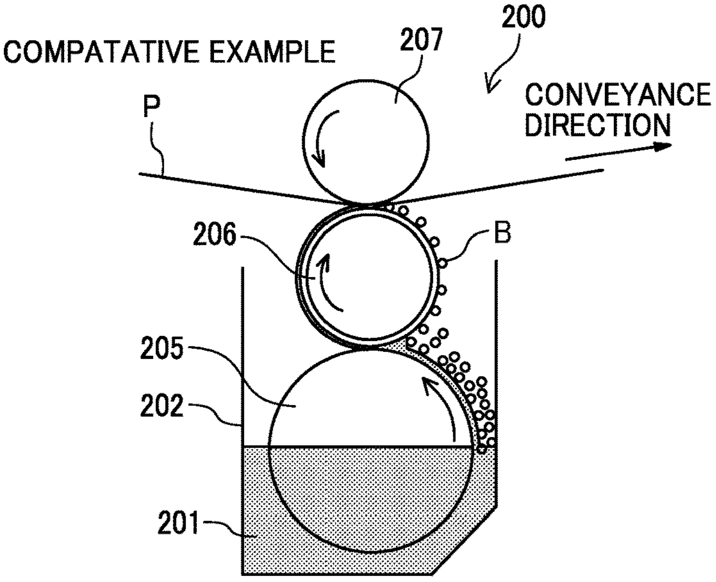
FIG. 7 is a schematic side view of a coating device according to the Comparative Example 1.

FIG. 7 is a schematic side view of the coating device according to the Comparative Example 1.

The coating device of the Comparative Example 1 in FIG. 7 does not include the defoaming blade 210 according to the first embodiment of the present disclosure.

If the sheet P is a sheet through which air easily passes, such as plain paper, fine gaps in the sheet P act like a sponge to generate bubbles during the treatment liquid 201 is applied onto the sheet P at the nip between the pressure roller 207 and the coating roller 206 in the Comparative Example 1.

Then, the generated bubbles B are transferred downward by a rotation of the coating roller 206, and are sent into the treatment liquid container 202 and continuously accumulated in the treatment liquid container 202. Further, the generated bubbles B are further increased by stirring with the treatment liquid 201 dipped up by the dipping roller 205.

As a result, a liquid level of the treatment liquid 201 in the treatment liquid container 202 rises, and the treatment liquid 201 and the bubbles B overflow from the treatment liquid container 202, and a coating performance of the coating device decreases.

Next, an effect of the coating device according to the first embodiment is described with reference also to FIG. 8.

Figure 8:
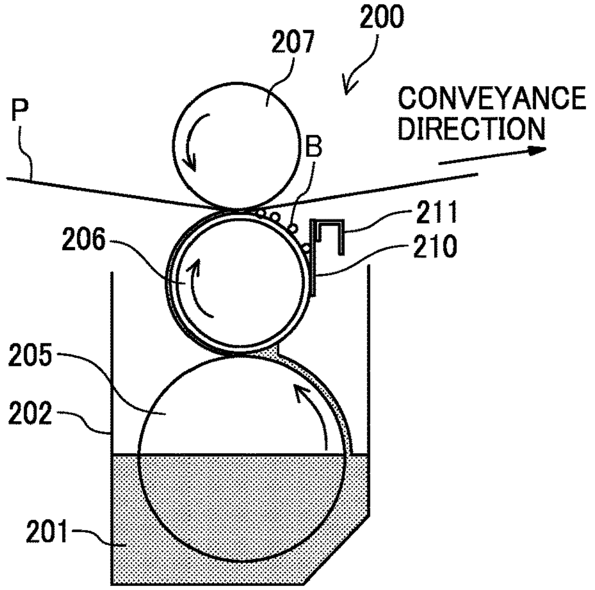
FIG. 8 is a schematic cross-sectional side view of the coating device illustrating an effect of the first embodiment.

FIG. 8 is a schematic cross-sectional side view of the coating device illustrating an effect of the coating device according to the first embodiment.

In the coating device according to the first embodiment, the defoaming blade 210 serving as a contacting member is brought into contact with the peripheral surface of the coating roller 206.

Therefore, the bubbles B generated during an application of the treatment liquid 201 onto the sheet P by the coating roller 206 are transferred downward toward the defoaming blade 210 by the rotation of the coating roller 206 and are crushed and eliminated between the defoaming blade 210 and the coating roller 206.

Thus, the defoaming blade 210 reduces an amount of the bubbles B moving into the treatment liquid container 202, reduces an occurrence of the treatment liquid 201 and the bubbles B overflowing from the treatment liquid container 202. Thus, the coating device according to the first embodiment can maintain the coating performance.

The coating device according to a second embodiment of the present disclosure is described with reference to FIG. 9.

Figure 9:
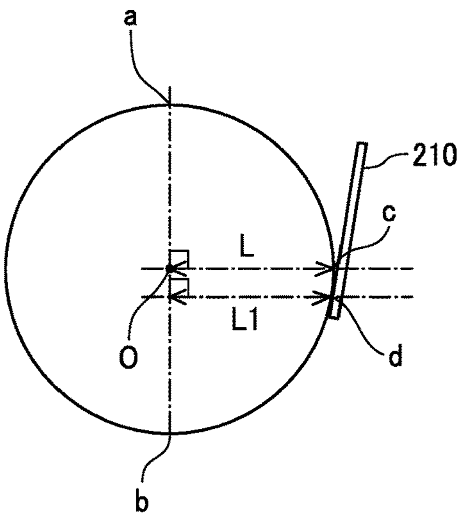
FIG. 9 is an enlarged partial side view of the coating device illustrating an arrangement of the contacting member of the coating device according to a second embodiment.

FIG. 9 is an enlarged partial side view of the coating device illustrating an arrangement of the defoaming blade 210 (contacting member) of the coating device according to the second embodiment.

The coating device in the second embodiment includes the defoaming blade 210 inclined with respect to the vertical direction. While the leading end portion of the defoaming blade 210 is in contact with the peripheral surface of the coating roller 206, a rear end portion (upper end portion in FIG. 9) of the defoaming blade 210 is inclined away from the peripheral surface of the coating roller 206 with respect to the vertical direction.

Thus, the contacting member (defoaming blade 210) is a blade, a longitudinal direction of cross-section of which is inclined with respect to the vertical direction.

If the defoaming blade 210 is disposed along the tangent direction of the coating roller 206, the defoaming blade 210 comes into contact with the peripheral surface of the coating roller 206 at a position "d". The position "d" is a position at which the distance L becomes a distance L1 as illustrated in FIG. 9.

The position "d" is downstream of the position "c" at which the distance L becomes the longest in the rotation direction of the coating roller 206. The distance L is a distance of a horizontal line perpendicular to the vertical line connecting the axial center O of the coating roller 206 and the application position "a". The distance L is from the vertical line and the peripheral surface of the coating roller 206.

Next, the coating device according to a third embodiment of the present disclosure is described with reference to FIG. 10.

Figure 10:
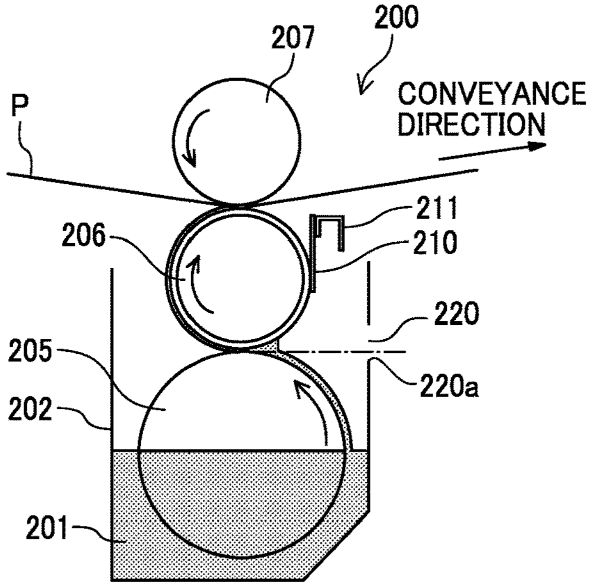
FIG. 10 is a schematic cross-sectional side view of the coating device according to a third embodiment of the present disclosure.

FIG. 10 is a schematic side view of the coating device according to the third embodiment of the present disclosure.

The coating device according to the third embodiment has a discharge hole 220 to discharge bubbles in a part of the treatment liquid container 202. A lowermost end 220*a* of the discharge hole 220 is disposed below the nip at a contact position between the dipping roller 205 and the coating roller 206. The contact position is a supply position at which the treatment liquid 201 is supplied from the dipping roller 205 to the coating roller 206.

Thus, the bubbles B that has not been crushed by the defoaming blade 210 can be discharged from the discharge hole 220 outside the treatment liquid container 202.

Next, the coating device according to a fourth embodiment of the present disclosure is described with reference to FIGS. 11 and 12.

Figure 11:
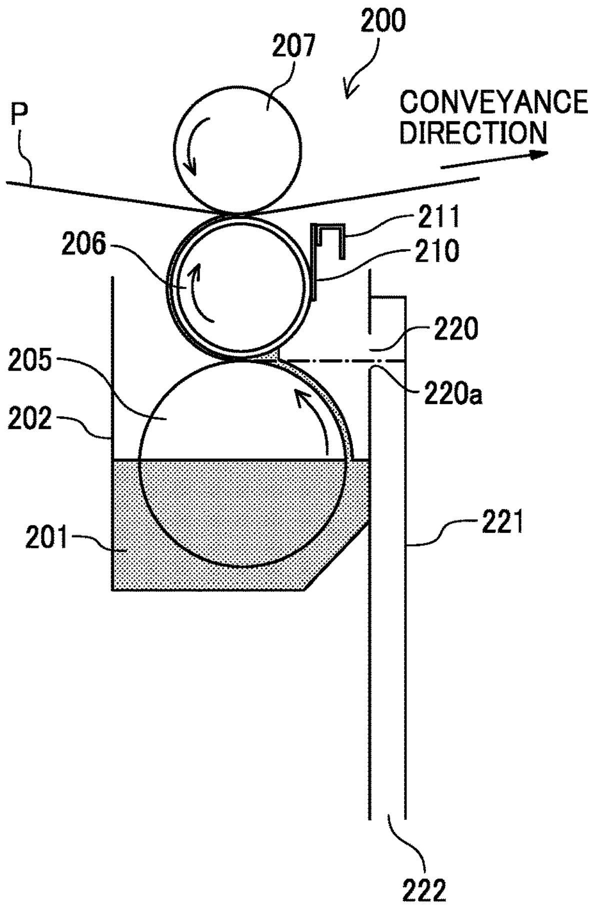
FIG. 11 is a schematic cross-sectional side view of the coating device according to a fourth embodiment of the present disclosure.

FIG. 11 is a schematic side view of the coating device according to the fourth embodiment of the present disclosure.

Figure 12:
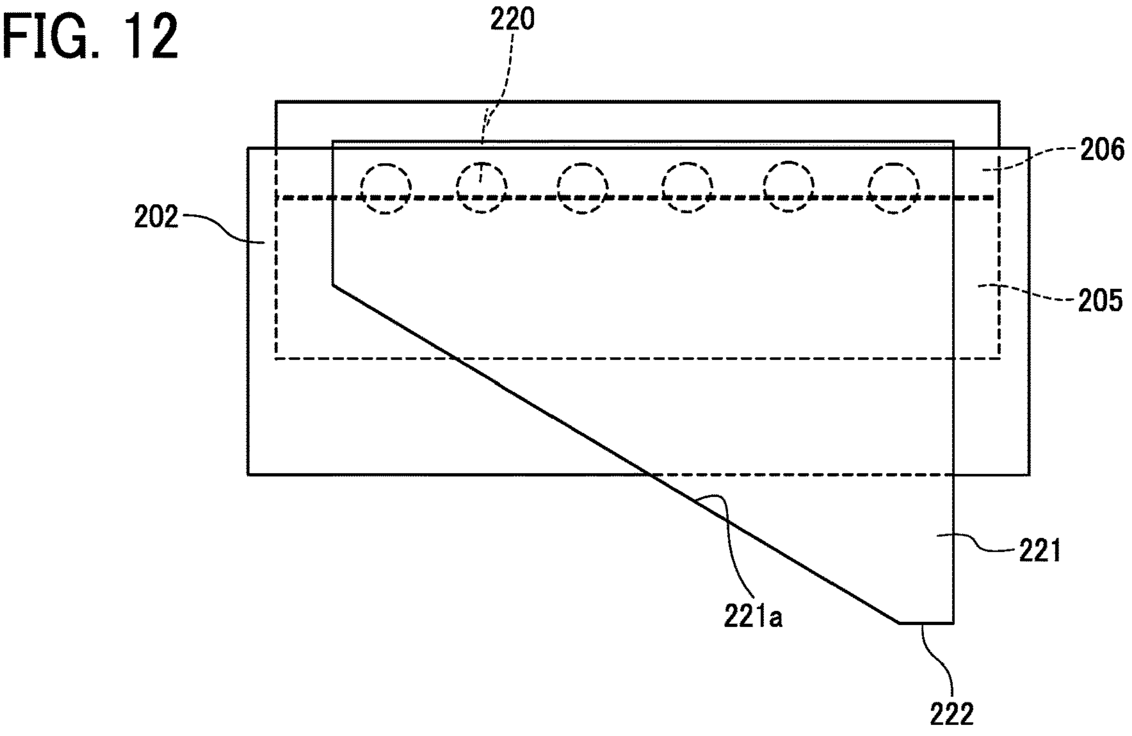
FIG. 12 is a schematic cross-sectional front view of the coating device of FIG. 11.

FIG. 12 is a schematic cross-sectional front view of the coating device of FIG. 11.

The coating device according to the fourth embodiment includes multiple discharge holes 220 to discharge bubbles B in a part of the treatment liquid container 202 along an axial direction of the coating roller 206 as illustrated in FIG. 12. Thus, the multiple discharge holes 220 are arrayed in the axial direction of the coating roller 206.

A lowermost end 220*a* of the discharge hole 220 is disposed below the nip at a contact position between the dipping roller 205 and the coating roller 206. The contact position is a supply position at which the treatment liquid 201 is supplied from the dipping roller 205 to the coating roller 206. Thus, the dipping roller 205 is configured to supply the treatment liquid to the coating roller 206.

The coating device includes a duct 221 communicating with the multiple discharge holes 220. The duct 221 guides the discharged bubbles B outside the treatment liquid container 202. The duct 221 has a discharge port 222 to discharge bubbles B outside the treatment liquid container 202. An inner bottom surface 221*a* of the duct 221 is formed as an inclined surface (see FIG. 12) so that bubbles B can be smoothly moved downward. Thus, the inner bottom surface 221*a* of the duct 221 is inclined with respect to a horizontal direction.

Each of the coating device in above-described embodiments uses the defoaming blade 210 that is a blade-shaped member serving as the contacting member, for example. However, a rotating body (defoaming roller) may be used as the contacting member.

An example of the printer 1 that performs printing on a web-shaped sheet is described in the above-described embodiment. The above-described embodiments may also be applied to a printer that performs printing on a large cut sheet such as a cut sheet or wallpaper. However, the coating device may be used to an electrophotographic printer.

The coating device according to the above-described embodiments can prevent reduction in the coating performance and maintain the coating performance.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A coating device comprising:

a coating roller configured to rotate in a rotation direction to apply a treatment liquid onto a sheet at an application position, wherein application of the treatment liquid to the sheet forms a number of bubbles in residual treatment liquid remaining on the coating roller following application to the sheet;

a contacting member in contact with a peripheral surface of the coating roller at a contact position downstream of the application position in the rotation direction, wherein the contacting member is configured to reduce the number of bubbles in the treatment liquid;

a container configured to contain the treatment liquid, wherein the container has a discharge hole configured to discharge bubbles outside the container; and a duct configured to guide the bubble discharged from the discharge hole, wherein an inner bottom surface of the duct is inclined with respect to a horizontal direction, wherein the contact position is upstream of a supply position at which the coating roller is supplied with the treatment liquid in the rotation direction, wherein a leading end portion of the contacting member is in contact with the peripheral surface of the coating roller at the contact position, and a rear end portion of the contacting member is separated from the coating roller, the rear end portion of the contacting member is at a non-contact position further upstream of the supply position than is the contact position of the leading end portion of the contacting member, and a distance between the contacting member and the peripheral surface of the coating roller gradually decreases from the rear end portion toward the leading end portion of the contacting member.

2. The coating device according to claim 1, wherein the contacting member is a blade, a longitudinal direction of cross-section of which is along a vertical direction.

3. The coating device according to claim 1, wherein the contacting member is a blade, a longitudinal direction of cross-section of which is inclined with respect to a vertical direction.

4. The coating device according to claim 1, wherein the discharge hole includes multiple discharge holes, and the multiple discharge holes are arrayed in an axial direction of the coating roller.

5. The coating device according to claim 1, wherein a lowermost end of the discharge hole is disposed below a supply position at which the coating roller is supplied with the treatment liquid.

6. The coating device according to claim 1, wherein the contacting member is a blade.

7. The coating device according to claim 6, wherein the blade is made of a plastic film.

8. The coating device according to claim 1, further comprising a dipping roller in contact with the coating roller, the dipping roller configured to supply the treatment liquid to the coating roller.

9. The coating device according to claim 8, further comprising a pressure roller facing the coating roller, the pressure roller configured to press the sheet against the coating roller.

10. The coating device according to claim 9, wherein the dipping roller is disposed below the coating roller, and the pressure roller is disposed above the coating roller, and the sheet passes through a nip between the pressure roller and the coating roller.

11. A liquid discharge apparatus comprising:

the coating device according to claim 1; and a liquid discharger configured to discharge a liquid onto the sheet.

12. A printer comprising:

the coating device according to claim 1; and a printing unit configured to print an image on the sheet.

13. The coating device according to claim 1, wherein the contacting member has a thickness of about 0.188 millimeters.

14. A coating device comprising:

a coating roller configured to rotate in a rotation direction to apply a treatment liquid onto a sheet at an application position; and a contacting member in contact with a peripheral surface of the coating roller at a position downstream of the application position in the rotation direction;

a container configured to contain the treatment liquid, wherein the container has a discharge hole configured to discharge bubbles outside the container; and a duct configured to guide the bubble discharged from the discharge hole, an inner bottom surface of the duct is inclined with respect to a horizontal direction, wherein the contact position is upstream of a supply position at which the coating roller is supplied with the treatment liquid in the rotation direction, wherein a leading end portion of the contacting member is in contact with the peripheral surface of the coating roller at the contact position, and a rear end portion of the contacting member is separated from the coating roller, the rear end portion of the contacting member is at a non-contact position further upstream of the supply position than is the contact position of the leading end portion of the contacting member, and a distance between the contacting member and the peripheral surface of the coating roller gradually decreases from the rear end portion toward the leading end portion of the contacting member.

* * * * *